June 18, 1929.  C. A. HAMSING  1,718,042
SLIDABLE AUTOMOBILE SEAT
Filed Dec. 16, 1926
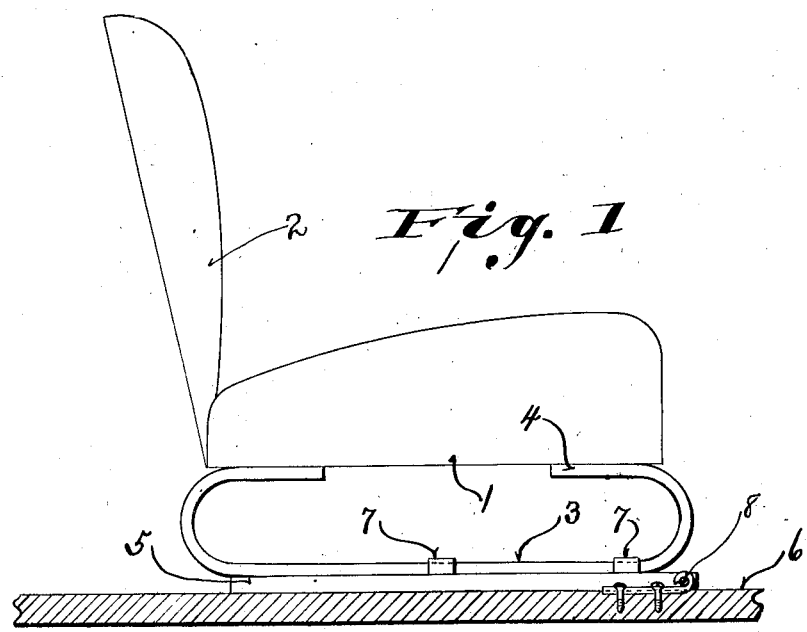
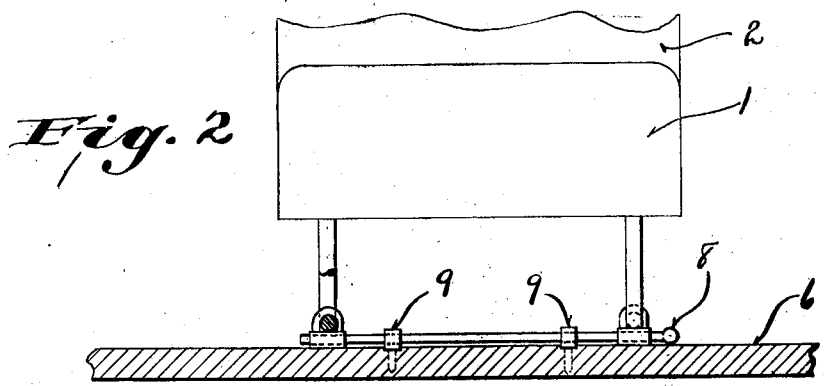
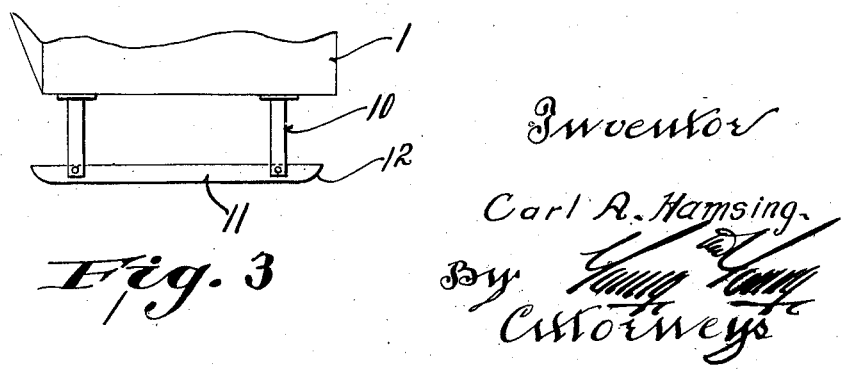
Inventor
Carl A. Hamsing
By
Attorneys Patented June 18, 1929.

1,718,042

UNITED STATES PATENT OFFICE.

CARL AUGUST HAMSING, OF MERRILL, WISCONSIN.

SLIDABLE AUTOMOBILE SEAT.

Application filed December 16, 1926. Serial No. 155,184.

This invention relates to a slidable automobile seat.

Objects of this invention are to provide a novel form of automobile seat which is slidably mounted to accommodate people having different lengths of legs so that the utmost convenience and comfort may be secured.

Further objects are to provide a slidable seat which is hingedly mounted and may be rocked upwardly to a 90° position similar to the seats commonly used in two-door sedans, or other similar types of automobiles.

Further objects are to provide a novel form of seat which is so made that it may be readily detached and removed from the automobile, if desired, by a simple operation, and which also has the characteristic of providing a material change in position to secure a wide range of adjustment.

Further objects are to provide a very simple construction which may be easily produced and may be very readily positioned in the automobile.

Embodiments of the invention are shown in the accompanying drawings in which:

Figure 1 is a side elevation of the seat showing the floor of the automobile in section;

Figure 2 is a front fragmentary elevation of the seat;

Figure 3 is a fragmentary view of a modified form.

Referring to the drawings, it will be seen that the seat comprises the usual body portion 1 and back 2. The body portion is carried by a pair of spaced runners 3 which have their upper inturned ends 4 secured rigidly to the body portion. The upper portions 4 are joined to the lower portions by means of curved ends, as indicated in Figure 1. The runners are carried by plates 5 hingedly mounted upon the floor 6 of the automobile. These plates are each provided with a pair of spaced guides 7 through which the runners or slides 3 may freely pass. The spacing of the guides is materially less than the length of the runners 3 so that there may be quite an extensive adjustment in the position of the seat.

The plates 5 are hingedly carried by means of a removable pintle pin 8. This pintle pin, in turn, is carried by eyelet portions 9 secured to the automobile floor 6.

In using the device, the operator slides the seat forwardly or backwardly to secure the desired adjustment. If it is desired to rock the seat upwardly to an out-of-the-way position, this may be readily accomplished by rocking the seat in the usual manner, the seat proper, the runners, and the plates 5 pivoting about the pintle pin 8.

If for any reason, it is desired to remove the seat as, for instance, when additional storage room is required in the automobile, such seat may be most easily removed by merely taking out the pintle pin 8.

In the modified form of the invention shown in Figure 3, the seat body has a set of downwardly extending struts or bars 10 which are rigidly attached to slides 11. These slides or runners 11 have rounded ends, as indicated at 12.

It will be seen that a novel form of seat has been provided, and it will be seen further that this seat may be most easily constructed by ordinary simple machine shop methods with the minimum of expense.

It is to be seen further that the seat may be very quickly attached or positioned, and may be easily manipulated. It is to be noted that the seat and runners may be freely moved forwardly and may overhang the pivot point of the elongated members. When in this position, the overhanging runners are adapted to contact with the floor and thus arrest forward tilting of the seat.

Although the invention has been described in considerable detail, such description is intended as illustrative rather than limiting as the invention may be variously embodied and as the scope of such invention is to be determined as claimed.

I claim:

1. In an automobile, the combination of a floor, a pair of apertured members secured to said floor, a pair of elongated members having eyelets at their front ends, means pivotally joining said first mentioned members and said elongated members and extending through the apertures of said first mentioned members, and through the eyelets of said elongated members, guides carried by said elongated members, a pair of runners slidably mounted within said guides and being of greater length than the space between said guides and adapted to overhang the pivot point of the elongated members when in one position, the upper ends of said runners being inturned, and a seat carried by the inturned upper ends of said runners, whereby said seat may be slid forwardly or backwardly and may overhang the pivot point of said elongated members when in its forward position, said runners adapted to contact with the floor to arrest forward tilting of said seat when said seat is in its most forward position.

2. In an automobile, the combination of a floor, a pair of eyeleted members secured to said floor, a pair of elongated members pivotally attached to said eyeleted members, said elongated members having upwardly projecting spaced guides, a pair of runners slidably mounted within said spaced guides, a seat spaced upwardly from said guides and carried by said runners and adapted to freely overhang the pivot point of said elongated members when in its forward position, said seat when in forward position having the runners extending beyond the extreme forward end of said elongated members, whereby said runners are adapted to contact with the floor and limit forward tilting of said seat.

In testimony that I claim the foregoing I have hereunto set my hand at Merrill, in the county of Lincoln and State of Wisconsin.

CARL AUGUST HAMSING.